United States Patent [19]

Stahlecker et al.

[11] Patent Number: 5,261,221
[45] Date of Patent: Nov. 16, 1993

[54] OPEN-END SPINNING ROTOR ASSEMBLY

[75] Inventors: Fritz Stahlecker, Josef-Neidhart-Strabe 18, 7347 Bad Überkingen; Gerhard Fetzer; Fritz Wabitsch, both of Süssen, all of Fed. Rep. of Germany

[73] Assignees: Fritz Stahlecker; Hans Stahlecker, both of Fed. Rep. of Germany

[21] Appl. No.: 933,009

[22] Filed: Aug. 21, 1992

Related U.S. Application Data

[63] Continuation of Ser. No. 722,228, Jun. 27, 1991, abandoned.

[30] Foreign Application Priority Data

Jun. 27, 1990 [DE] Fed. Rep. of Germany ....... 4020411

[51] Int. Cl.$^5$ ...................... D01H 4/00; D01H 13/00
[52] U.S. Cl. .......................... 57/406; 57/104; 57/105; 384/243
[58] Field of Search ............... 384/243, 244, 245, 249, 384/420, 425, 406; 57/104, 105

[56] References Cited

U.S. PATENT DOCUMENTS

| 405,559 | 6/1889 | Johansson | 384/243 X |
|---|---|---|---|
| 650,097 | 5/1900 | Rotter | 384/243 |
| 847,803 | 3/1907 | Morgan | 384/243 X |
| 1,012,662 | 12/1911 | Lawson | 384/243 |
| 1,096,524 | 5/1914 | Holth | 384/243 |
| 2,100,218 | 11/1937 | Kelley | 384/245 |
| 2,229,969 | 1/1941 | Goss | 384/244 |
| 2,443,856 | 6/1948 | Hermanny | 384/420 X |
| 2,702,675 | 2/1955 | Leaver | 384/244 X |
| 3,805,506 | 4/1974 | Stahlecker | 57/104 |
| 3,838,560 | 10/1974 | Stahlecher | 57/92 |
| 4,763,469 | 8/1988 | Stahlecker et al. | 57/105 X |

FOREIGN PATENT DOCUMENTS

| 1901453 | 8/1971 | Fed. Rep. of Germany . | |
| 2716573 | 10/1978 | Fed. Rep. of Germany . | |
| 0016288 | 7/1898 | United Kingdom | 384/420 |

*Primary Examiner*—Daniel P. Stodola
*Assistant Examiner*—William Stryjewski
*Attorney, Agent, or Firm*—Evenson, McKeown, Edwards & Lenahan

[57] ABSTRACT

In the case of an open-end spinning rotor assembly composed of a rotor and a rotor shaft, it is provided that the free end of the rotor shaft is equipped with an exchangeable supporting element assigned to a step bearing. The supporting element has a centric guiding surface which is assigned to a concentric guiding surface of the shaft, the axial length of the guiding surface of the supporting element being larger than half the overall axial length of the supporting element.

16 Claims, 4 Drawing Sheets

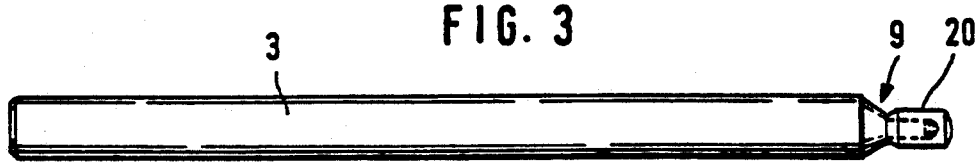
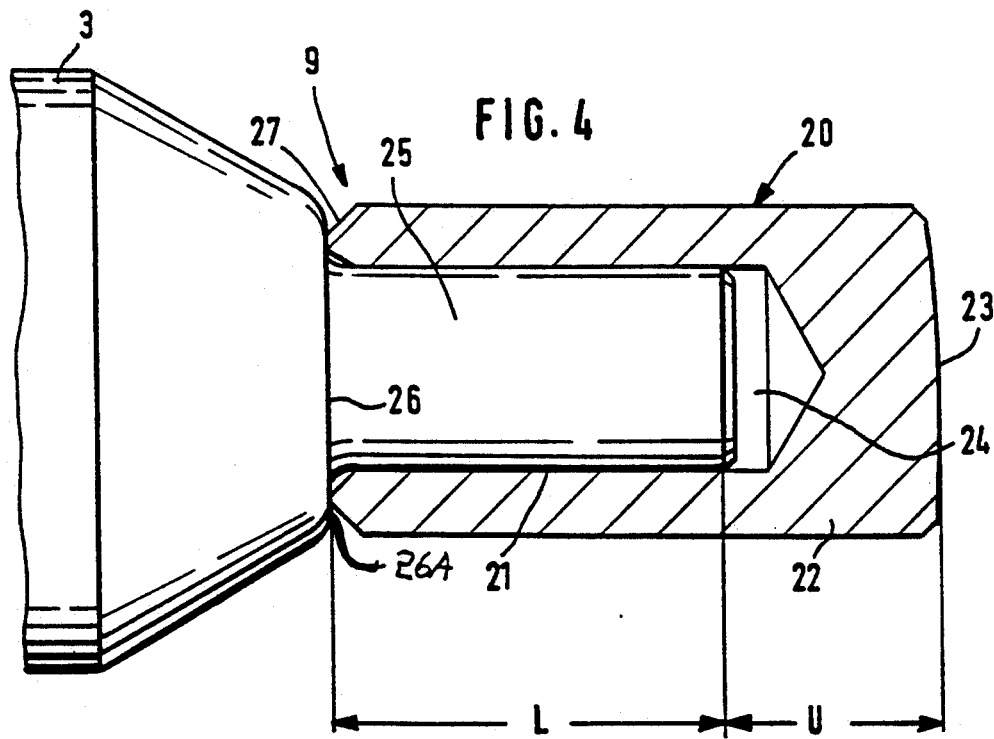

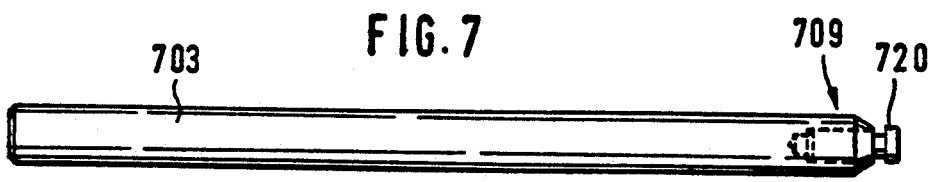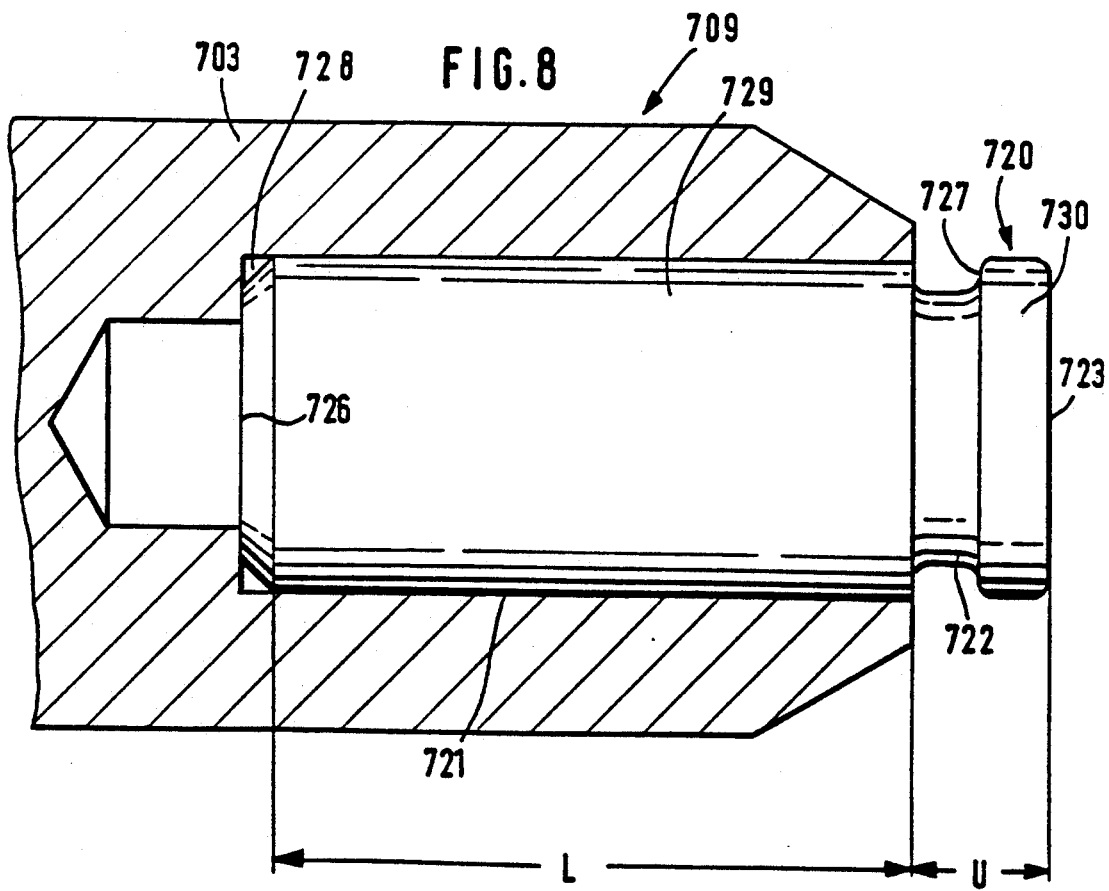

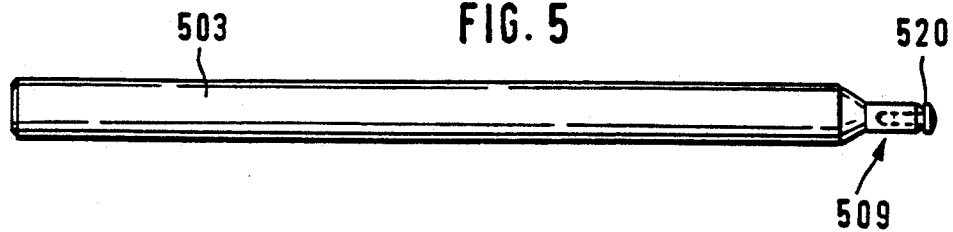
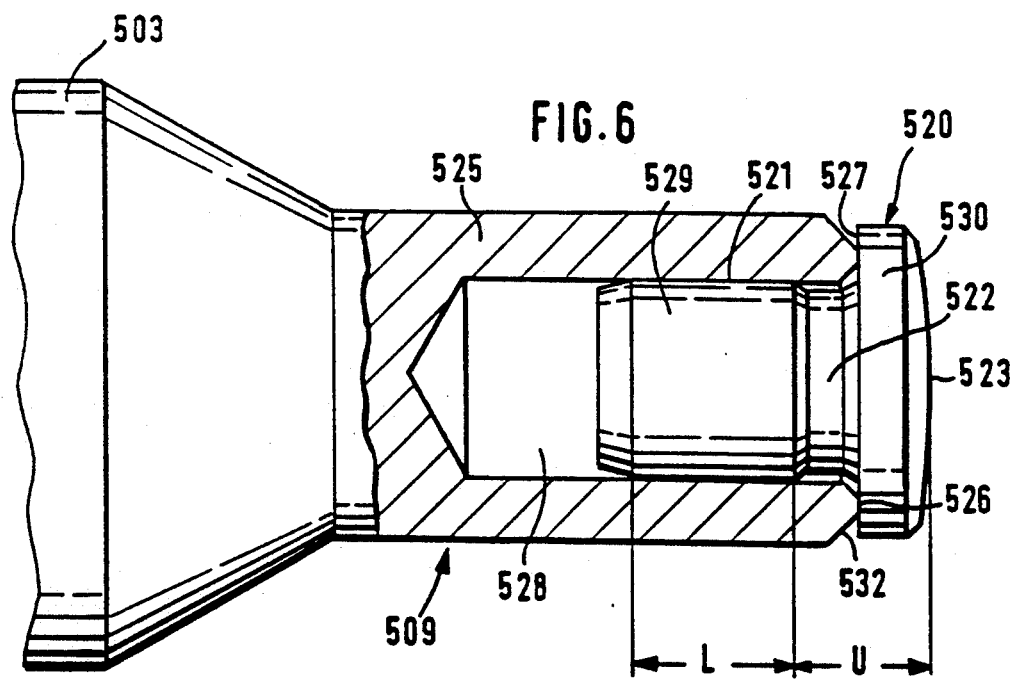

OPEN-END SPINNING ROTOR ASSEMBLY

This is a continuation of application Ser. No. 07/722,228, filed Jun. 27, 1991, now abandoned.

BACKGROUND AND SUMMARY OF THE INVENTION

The invention relates to an open-end spinning rotor assembly having a rotor and a rotor shaft, the free end of which rotor shaft is provided with an exchangeable supporting element which is assigned to a step bearing.

In practice, open-end spinning rotors are used today in rotor spinning machines, the shaft of which is a one-piece component which has no supporting element on its end. Although it is known to mount supporting elements on the free end of the spinning rotor shaft, these solutions are not used in practice. It is known, for example, on the basis of the German Patent Document DE-A 27 16 573, FIG. 3, to mount a pin-type projection on the shaft end which penetrates into a step bearing housing.

From the German Patent Document DE-A 19 01 453, FIG. 26, it is known to mount on the free front face of the shaft of an open-end spinning rotor a supporting element made of hard metal, of a diamond, or a ceramic material which, under certain circumstances, should also be exchangeable. This supporting device has a semispherical design.

The spinning rotors used today rotate at very high rotational speeds which are above 100,000 $\text{min}^{-1}$. The rotors of these open-end spinning rotor assemblies, which previously were worn out relatively fast, have been improved so much that they permit a relatively long period of usability which is considerably extended in comparison to the previous period of usability. It was found that under these conditions—a high rotational speed of the rotor, on the one hand, and a long durability of the rotors, on the other hand—wear occurs on the end of the rotor shaft assigned to the step bearing. This wear results in a shortening of the shaft and thus to a change of position of the rotor. Although it is possible to correct this change of position by an adjusting of the step bearing, this correcting is not very suitable for practical operations. The reason is that in practice there is the requirement that the open-end spinning rotors of the individual spinning points of a machine are to be exchangeable with one another. It is therefore not practical to individually adjust the position of the open-end spinning rotors. The expenditures of reusing the rotor and exchanging the shaft are high so that today the whole open-end spinning rotor assembly, that is, the rotor and the shaft, are used as exchangeable parts, the durability of which is predominantly determined by the wear of the rotor shaft. The known suggestions concerning possibly exchangeable supporting elements at the end of the rotor shaft also require expenditures which are so excessive that they are no longer economical.

It is an object of the invention to provide exchangeable supporting elements for open-end spinning rotors of the initially mentioned type which can be exchanged easily so that it makes sense economically.

This object is achieved according to preferred embodiments of the invention in that the supporting element has a centric guiding surface which is assigned to a guiding surface of the shaft which is concentric with respect to the shaft axis, and the axial length of which is larger than half the overall axial length of the supporting element.

In this case, the invention is based on the recognition that an exchanging of supporting elements will result in lower costs and therefore be economical only if the exchange is carried out in such a manner that, after an exchange, there will be no impermissible unbalanced masses which lead to an additional balancing of the whole open-end spinning rotor assembly. This idea is implemented in that relatively long guiding surfaces are provided by which the supporting element is connected with a rotor shaft. As a result, there is a low risk from the start that, because of the exchange of the supporting element, ovalization occurs which results in unbalanced masses.

In a further development of the invention, it is provided that the guiding surface of the supporting element with respect to the guiding surface of the shaft is dimensioned such that the two guiding surfaces together form a press fit. On the one hand, this type of a connection is easy to establish while, on the other hand, in addition, the possibility is excluded that the risk of unbalanced masses is increased because of fastening devices.

In order to facilitate the exchange of the supporting element, it is advantageous for the supporting element, in a further development of the invention, to be provided with an essentially radial application surface for a pull-off tool. This permits a simple and fast demounting of the worn-out supporting element.

In a further development of the invention, it is provided that the supporting element is provided with a stop surface which is assigned to a stop of the shaft. This ensures that axial loads do not cause the supporting element to change its position relative to the shaft whereby the position of the rotor plate may again be changed in an impermissible manner.

Other objects, advantages and novel features of the present invention will become apparent from the following detailed description of the invention when considered in conjunction with the accompanying drawings.

BRIEF DESCRIPTION OF THE DRAWINGS

FIG. 3 is a view of a shaft of an open-end spinning rotor assembly with a cap-type supporting element;

FIG. 4 is an axial partial view of the supporting element of FIG. 3 which is enlarged approximately 10 times;

FIG. 5 is a view of a shaft of an open-end spinning rotor with another embodiment of an exchangeable supporting element;

FIG. 6 is an axial sectional view in the area of the supporting element of the embodiment according to FIG. 5 which is enlarged approximately 10 times;

FIG. 7 is a view of a shaft of an open-end spinning rotor with another embodiment of a supporting element; and FIG. 8 is an axial partial sectional view of the area of the supporting element of FIG. 7 which is enlarged approximately 10 times.

DETAILED DESCRIPTION OF THE DRAWINGS

Figure 1:
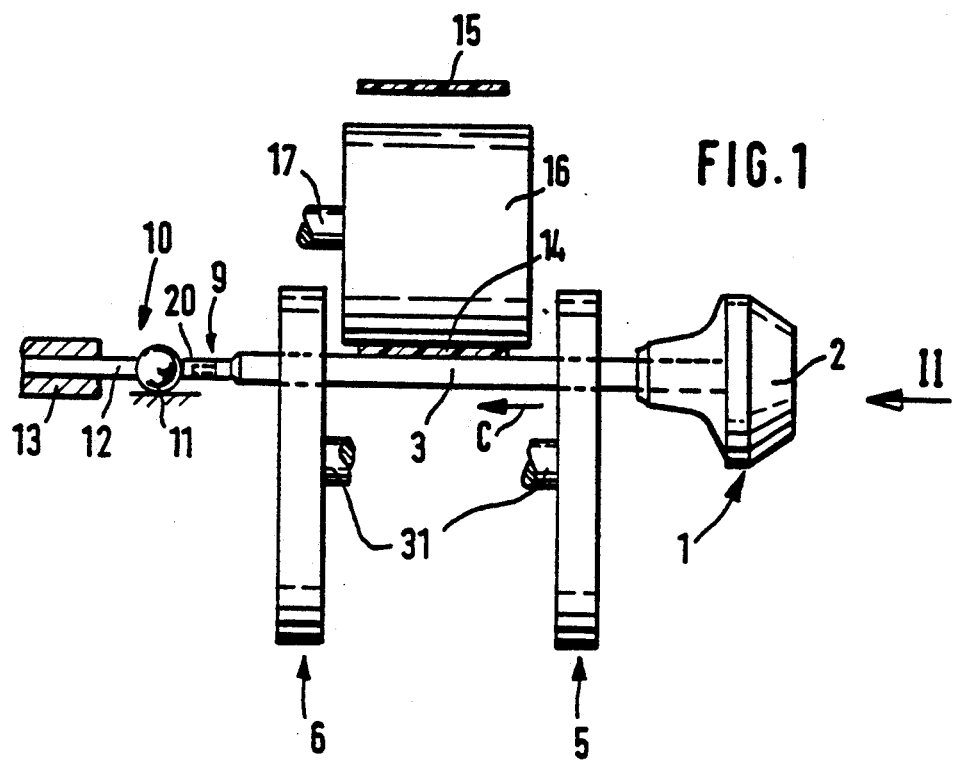
FIG. 1 is a schematic partial sectional lateral view of a supporting disk bearing arrangement for an open-end spinning rotor assembly which is provided with an exchangeable supporting element in accordance with a preferred embodiment of the invention.
Figure 2:
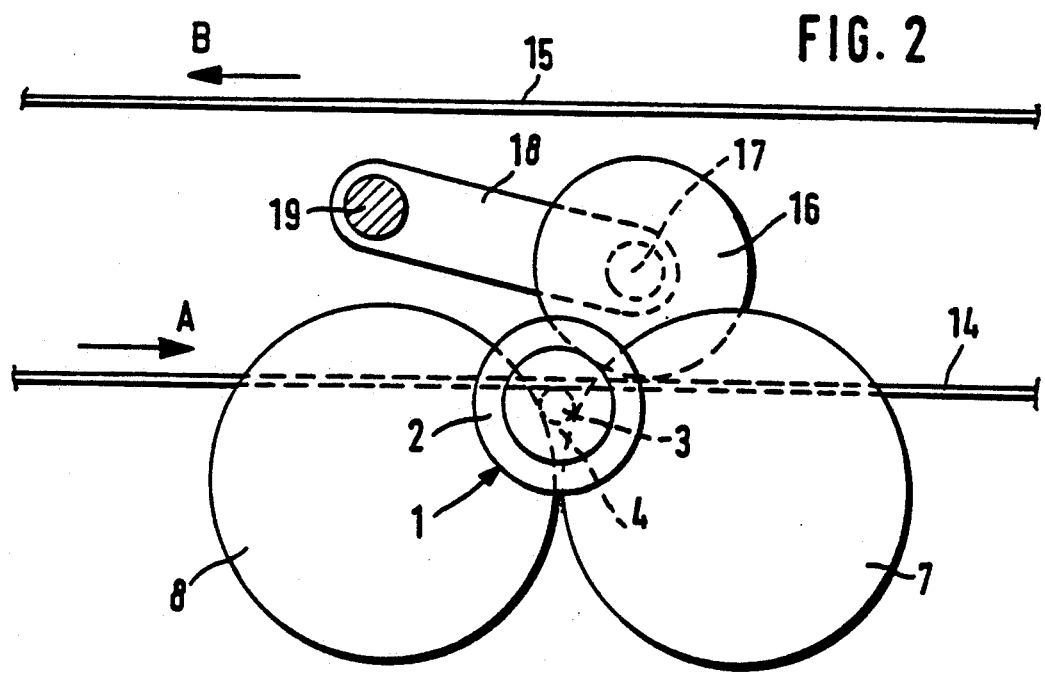
FIG. 2 is a view taken in the direction of the arrow II of FIG. 1.

The bearing for an open-end spinning rotor 1 illustrated in FIGS. 1 and 2, which has a rotor 2 which is non-rotatably connected with a rotor shaft 3, is constructed as a so-called supporting disk bearing. The shaft 3 is radially disposed in the wedge-shaped gaps 4 of two pairs of supporting disks 5 and 6 which are each formed of supporting disks 7, 8. The supporting disks 7, 8 on one side of the shaft 3 are each arranged on common shafts 31 which, in a manner not shown in detail, are disposed in a roller bearing in a bearing block. In the axial direction, the end 9 of the shaft 3, which is equipped with an exchangeable supporting element 20, is supported against a step bearing 10. The step bearing 10 comprises a freely rotatable ball 11 which is driven to perform rotations on the basis of vibrations. On the side opposite the end 9 of the shaft 3, the ball 11 is supported by means of a pin 12 which is held adjustably in the axial direction in a housing 13.

The shaft 3 is driven by means of a tangential belt 14 which places itself on the shaft 3 from above and holds it in the wedge-shaped gaps 4. By means of a contact pressure roller 16, the tangential belt 14 is loaded in the direction of the wedge-shaped gaps 4. The contact pressure roller 16 can freely rotatably be rotated on a shaft 17 extending essentially in parallel to the rotor shaft 3, the shaft 17 being held by a swivel arm 18 which can be swivelled around a shaft 19. In a manner not shown in detail, the swivel arm 18 is provided with a loading spring. The tangential belt 14 drives the spinning rotors 1 of all spinning points of one side of the machine. Its returning end 15 is guided back above the contact pressure rollers 16 in the direction of the arrow B.

The shafts 31 of the supporting rollers 7, 8 are set slightly obliquely with respect to one another so that, because of the moving direction (A) of the tangential belt 14, in connection with the oblique positioning of the shafts 31 of the supporting disks 7, 8, the tangential belt exercises an axial thrust (C) on the shaft which loads the shaft 3 in the direction of the step bearing 10. Because of the very high rotational speeds of the rotor, wear occurs on the supporting element 20 after a fairly long period of usage by which the supporting element 20 is shortened in its axial length so that, as a result, the position of the rotor 2 will also change. As soon as this change of the axial position, which can be recognized and measured on the rotor, exceeds a permissible value, the supporting element 20 will be exchanged. The supporting element 20 is constructed in such a manner that, on the one hand, it can be detached relatively easily from the rotor shaft 3 and be replaced by a new supporting element 20. On the other hand, it is provided in this case that the supporting element 20 is constructed such that during this exchange the rotor shaft 3 is not changed in such a manner that an unbalanced mass may occur so that, after such an exchange, the open-end spinning rotor assembly does not have to be newly balanced.

As shown in FIGS. 3 and 4, the shaft 3 has, to the area of its end 9, a smooth cylindrical design. At its end 9, by way of a truncated-cone-shaped intermediate piece, it changes into a cylindrical pin 25 which extends centrically to its axis. Between the pin 25 and the truncated-cone-shaped intermediate piece, a collar-type radial surface 26 is situated which serves as an axial stop for the supporting element 20. The supporting element 20, which like the rotor shaft 3 is made of steel, has a cap-shaped design with a cylindrical outer contour. The supporting surface 23, by means of which the supporting element 20 comes to rest on the ball 11 of the step bearing 10, is arched slightly convexly. The supporting element 20 is also provided with an axial bore 24 which is open in the direction of its end opposite to the supporting surface 23. By means of this axial bore 24, the supporting element 20 is pushed onto the pin 25 until its end supports itself against the radial surface 26 of the shaft 3. The outer diameter of the pin-shaped section 25 and the inner diameter of the axial bore 24 are coordinated with one another such that a press fit is obtained. The pin-shaped section 25 is chamfered at its end. The axial bore 24 is also chamfered at its end in the same manner so that a secure joining is possible when the supporting element 20 is slid on.

As shown particularly in FIG. 4, a cylindrical guiding surface 21 exists between the supporting element 20 and the shaft 3, the axial length (L) of this guiding surface amounting to approximately two thirds of the whole axial length of the supporting element; that is, the unguided projecting part 22 of the supporting element 20 has an axial length (U) which is approximately 50% shorter than the length (L) of the guiding surface 21. In this manner, a very secure centering is achieved between the supporting element 20 and the rotor shaft 3 so that an impermissible unbalanced mass also does not occur after the exchange of the supporting element 20.

As also shown in FIG. 4, the end of the supporting element 20, which is opposite the supporting surface 23, is provided with an extensive chamfering which forms an area of application for a pull-off tool T, shown schematically in dash lines in FIG. 4. As further shown in FIG. 4, the chamfer serving as the area of application 27 is drawn so far toward the inside, that is, to such a small diameter of the supporting element 20 that the radial surface 26 is partially exposed at 26A. Therefore this radial surface 26A may be used as a countersurface for a pull-off tool during a pulling-off. However, the truncated-cone-shaped section between the cylindrical section of the shaft 3 and the pin-type section 25 can also be used as the countersurface according to other preferred embodiments contemplated by the invention.

In the embodiment according to FIG. 5 and 6, a cylindrical section of the shaft 503 is also reduced, by way of a truncated-cone-shaped section, to a pin-shaped section 525 which forms the free end 509 of the rotor shaft 503. The pin-type section 525 is provided with an axial bore 528 in which the supporting element 520 is held which is equipped with a pin-type guiding part 529. This pin-type guiding part 529 is followed, by way of a neck 522 which has a smaller diameter, by a head-type section 530, the outer diameter of which corresponds approximately to the outer diameter of the pin-type section 525 of the shaft 503. This head-type section 530 is provided with a convex supporting surface 523. At its inserting end, the pin-type guiding part 529 is provided with a chamfering. In a similar manner, the axial bore 528 is provided with a chamfering. The head-type section 530 places itself against the end of the pin-shaped section 525 constructed as the radial stop surface 526. At its end, this pin-shaped section 525 is provided with a chamfering 532 by which a collar-type section 527 is created on the front side of the head 530 facing away from the supporting surface 523. This section 527 forms an area of application for a pull-off tool. The chamfering 532 may serve as the countersurface for the pull-off tool.

Also in the case of this embodiment, the outer diameter of the cylindrical section 529 of the supporting element 520 is adapted to the inner diameter of the axial bore 528 of the shaft 503 in such a manner that, during a pushing-in, a press fit is obtained. The cylindrical section 529 of the supporting element 520 forms a guiding surface 521 which centers the supporting element 520 and has a length (L) which is clearly larger than the connecting neck 52 and the head 530 which together have a length (U). Also in this embodiment, the length (L) of the guiding surface 521 amounts to more than half the overall axial length of the supporting element 520. The remaining hollow space of the axial bore 528 is so large that it permits a compressing of the air.

In the embodiment according to FIGS. 7 and 8, the rotor shaft 703 has a cylindrical shape up to its end 709. In the area of the end 709, it is provided with a truncated-cone-shaped section, a head-shaped section 730 of a supporting element 720 projecting out of the truncated-cone-shaped section. The supporting element 720 is provided with a supporting surface 723 which—deviating from the shown embodiment—may also have a convex construction. The head-shaped section 730 is followed by a neck-shaped section 722 which is produced by a ring groove and which is followed by a cylindrical section 729, the outer diameter of which corresponds to the outer diameter of the head-shaped section 730. The cylindrical section 729, which is provided with a chamfering, is inserted into a central axial bore 728 of the shaft 703. This axial bore 728 is bounded by a collar forming a radial surface 726 against which the front end of the cylinder surface 729 comes to rest.

Also in this embodiment, the outer diameter of the cylindrical section 729 is adapted to the inner diameter of the axial bore 728 in such a manner that a press fit is obtained. Between the cylindrical section 729 and the axial bore 728, a guiding surface 721 exists, the axial length (L) of which amounts to approximately 5 times the length (U) of the part projecting out of the shaft 703, that is, of the head-shaped section 730 and the neck-shaped section 722. The front face of the head-shaped section 730 which is situated opposite the supporting surface 723 serves as an area of application 727 for a pull-off tool. The end of the shaft 703 may be used as the countersurface.

As was explained concerning all embodiments, the supporting elements 20, 520, 720 are guided by means of centric guiding surfaces 21, 521, 721, the lengths (L) of which are significantly larger than half the total length (L+U) of the respective supporting elements 20, 520, 720. This ensures that, in the case of the fitting on (supporting element 20) or in the case of the inserting (supporting element 520, 720), a centering between the supporting element 20, 520, 720 and the rotor shaft 3, 503, 703 is obtained with a high reliability. Since these supporting elements 20, 520, 720, in comparison to the respective rotor shaft 3, 503, 703, in addition, have only a relatively small mass, it is ensured with sufficient precision that, during an exchange, the balanced condition of the open-end spinning rotor assembly is not lost.

In all embodiments, it is possible to arrange the supporting elements 20, 520, 720 such that no axial stop is provided. This means, however, that a relatively narrow press fit must be obtained by means of corresponding dimensions so that the risk is excluded that the supporting element 20, 520, 720 changes its position relative to the shaft 3, 503, 703 during the operation. Instead of using press fits, it is also contemplated according to other embodiments to connect the supporting elements 20, 520, 720 with the respective shaft 3, 503, 703 by way of a corresponding thread. In this case, it is expedient to provide fine-pitch threads so that during an exchange it is sufficiently reliably avoided that unbalanced masses are created.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An open-end spinning rotor assembly comprising:
   a rotor,
   a rotor shaft having a first end supporting the rotor and a second opposite free end,
   and an exchangeable supporting element provided at the free end of the rotor shaft and having a supporting surface for engagement with a step bearing with said supporting element and rotor shaft serving to axially space the rotor with respect to the step bearing,
   wherein the supporting element and rotor shaft have respective cylindrical centric guide surfaces engageable with one another,
   wherein the supporting element is provided with a radial application surface for a pull-off tool, facing said first end,
   wherein the engageable cylindrical guide surfaces extend axially over a distance which is more than half the overall axial length of the supporting element to thereby precisely radially locate the supporting element and rotor shaft element and rotor shaft with respect to one another.

2. An open-end spinning rotor assembly according to claim 1, wherein the guiding surface of the supporting element with respect to the guiding surface of the rotor shaft is dimensioned such that the two guiding surfaces together form a press fit.

3. An open-end spinning rotor assembly according to claim 2, wherein the supporting element is provided with an axial stop surface which is assigned to an axial stop surface of the rotor shaft to axially locate the supporting element on the rotor shaft, said stop surfaces being spaced from the cylindrical guide surfaces.

4. An open-end spinning rotor assembly according to claim 2, wherein the cylindrical guide surface of the supporting element is provided on a pin-type projection which is assigned to an axial bore of the rotor shaft which serves as the cylindrical guide surface of the rotor shaft.

5. An open-end spinning rotor assembly according to claim 2, wherein the supporting element has a cylindrical outer contour and has a cap-type construction and is provided with an axial bore which serves as the supporting element guide surface, said axial bore being assigned to a pin-type section of the rotor shaft which has the rotor shaft guide surface on its circumference.

6. An open-end spinning rotor assembly according to claim 5, wherein the axial bore is provided with a chamfer on its inserting side.

7. An open-end spinning rotor assembly according to claim 6, wherein an end of the cap-type supporting element which faces away from its supporting surface is provided with a ring shoulder on the outside.

8. An open-end spinning rotor assembly according to claim 7, wherein the cap-type supporting element has an outer diameter which is smaller than the outer diameter of a remaining area of the rotor shaft adjacent the portion covered by the cap-type supporting element during use.

9. An open-end spinning rotor assembly according to claim 2, wherein the supporting element is provided with a head-type section forming the supporting surface for a section forming a step bearing engaging surface.

10. An open-end spinning rotor assembly according to claim 1, wherein the supporting element is provided with an axial stop surface which is assigned to an axial stop surface of the rotor shaft to axially locate the supporting element on the rotor shaft, said stop surfaces being configured and spaced from the cylindrical guide surfaces so that said axial stop surfaces and cylindrical guide surfaces operate independently to accommodate precise respective radial and axial location of the supporting element with respect to the rotor shaft.

11. An open-end spinning rotor assembly according to claim 1, wherein the cylindrical guide surface of the supporting element is provided on a pin-type projection which is assigned to an axial bore of the rotor shaft which serves as the cylindrical guide surface of the rotor shaft.

12. An open-end spinning rotor assembly according to claim 1, wherein the supporting element has a cylindrical outer contour and has a cap-type construction and is provided with an axial bore which serves as the supporting element guide surface, said axial bore being assigned to a pin-type section of the rotor shaft which has the rotor shaft guide surface on its circumference.

13. An open-end spinning rotor assembly according to claim 12, wherein the axial bore is provided with a chamfer on its inserting side.

14. An open-end spinning rotor assembly according to claim 12, wherein an end of the cap-type supporting element which faces away from its supporting surface is provided with a ring shoulder on the outside.

15. An open-end spinning rotor assembly according to claim 12, wherein the cap-type supporting element has an outer diameter which is smaller than the outer diameter of a remaining area of the rotor shaft adjacent the portion covered by the cap-type supporting element during use.

16. An open-end spinning rotor assembly according to claim 1, wherein the supporting element is provided with a head-type section forming the supporting surface for a section forming a step bearing engaging surface.

* * * * *